US012719949B2

(12) United States Patent
Fujioka et al.

(10) Patent No.: US 12,719,949 B2
(45) **Date of Patent: *Aug. 25, 2026**

(54) EDGE CONFIGURATION SERVER, MULTI-ACCESS SYSTEM, METHOD, AND COMPUTER-READABLE MEDIUM

(71) Applicant: NEC Corporation, Tokyo (JP)

(72) Inventors: Shintaro Fujioka, Tokyo (JP); Yutaro Obara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 18/887,455

(22) Filed: Sep. 17, 2024

(65) Prior Publication Data

US 2025/0016225 A1 Jan. 9, 2025

Related U.S. Application Data

(63) Continuation of application No. 18/235,186, filed on Aug. 17, 2023, now Pat. No. 12,126,677.

(30) Foreign Application Priority Data

Aug. 24, 2022 (JP) ................................ 2022-132895

(51) Int. Cl.
*H04L 67/1061* (2022.01)
*H04L 67/51* (2022.01)
*H04L 67/568* (2022.01)

(52) U.S. Cl.
CPC .......... *H04L 67/1061* (2013.01); *H04L 67/51* (2022.05); *H04L 67/568* (2022.05)

(58) Field of Classification Search
CPC ... H04L 67/1061; H04L 67/51; H04L 67/568; H04L 67/10; H04L 67/34
See application file for complete search history.

(56) References Cited

U.S. PATENT DOCUMENTS

2023/0108959 A1 4/2023 Kim ........................ H04W 8/00 370/329
2023/0254202 A1* 8/2023 Lee .................... H04L 41/0803 709/223

(Continued)

FOREIGN PATENT DOCUMENTS

WO 2018/078987 A1 5/2018
WO WO-2023244085 A1 12/2023

OTHER PUBLICATIONS

ETSI GR MEC 035 v3.1.1 (Jun. 2021) "Multi-access Edge Computing (MEC); Study on Inter-MEC systems and MEC-Cloud systems coordination", the European Telecommunications Standards Institute, Jun. 2021.

(Continued)

*Primary Examiner* — Chris Parry
(74) *Attorney, Agent, or Firm* — Sughrue Mion, PLLC

(57) ABSTRACT

An edge configuration server, a multi-access system, a method, and a computer-readable medium are provided that make it possible to relocate an application context between different multi-access edge computing systems. An edge configuration server according to the present disclosure is a server included in a multi-access edge computing (MEC) system, and includes: a reception unit configured to receive, from a source-edge enabler server (S-EES) in the MEC system, an inquiry about a relocation target of an application context; and a transmission unit configured to transmit, to another edge configuration server (ECS) in another MEC system, an inquiry about the relocation target.

5 Claims, 13 Drawing Sheets

(56) References Cited

U.S. PATENT DOCUMENTS

| | | | | |
|---|---|---|---|---|
| 2023/0412698 | A1* | 12/2023 | Kim | H04W 88/18 |
| 2024/0022469 | A1 | 1/2024 | Hu | H04L 41/0803 |
| 2024/0187303 | A1* | 6/2024 | Yao | H04L 67/51 |
| 2024/0388884 | A1* | 11/2024 | Hu | H04W 8/065 |

OTHER PUBLICATIONS

3GPP TS23.558 V17.4.0 (Jun. 2022) "3rd Generation Partnership Project; Technical Specification Group Services and System Aspects; Architecture for enabling Edge Applications; (Release 17)".
Japanese Office Action for JP Application No. 2022-132895, mailed on Apr. 7, 2026 with English Translation.
Huawei, Hisilicon, "Solution on T-EAS discovery in roaming scenario", 3GPP TSG SA WG6 #047-e S6-220256, Feb. 14-22, 2022.
3GPP TR 23.700-98 V0.4.0 (Dec. 2021), Dec. 15, 2021.

* cited by examiner

| Information element | Status | Description |
|---|---|---|
| EESID | Mandatory | Unique identifier of the EES. |
| Security credentials | Mandatory | Security credentials resulting from a successful authorization for the edge computing service. |
| EASID | Mandatory | The EASID. |
| Target DNAI | Optional | The target DNAI information which can be associated with potential T-EES(s) and/or T-EAS(s). |
| UE Identifier | Optional | The identifier of the UE (i.e. GPSI or identity token) |
| UE location | Optional | The location information of the UE. The EU location is described in clause. |

Fig. 6

| Information element | Status | Description |
|---|---|---|
| > List of EDN configuration information | Mandatory | List of EDN configuration information as defined in Table 8.3.3.3.3-2 |
| EDN connection information (NOTE 1) | Mandatory | Information required by the UE to establish connection with the EDN. |
| > DNN/APN | Mandatory | Data Network Name/Access Point Name |
| List of EESs | Mandatory | List of EESs of the EDN. |
| > EESID | Mandatory | The identifier of the EES |
| > EES Endpoint | Mandatory | The endpoint address (e.g. URI, IP address) of the EES |
| > EEC registration configuration | Mandatory | Indicates whether the EEC is required to register on the EES to use edge services or not. |

Fig. 7

| Information element | Status | Description |
| --- | --- | --- |
| EESID | Mandatory | Unique identifier of the EES. |
| Security credentials | Mandatory | Security credentials resulting from a successful authorization for the edge computing service. |
| ECS ID | Mandatory | Unique ID of the ECS. Indicates which ECS covers the system. |
| EASID | Mandatory | The EASID. |
| Target DNAI | Optional | The target DNAI information which can be associated with potential T-EES(s) and/or T-EAS(s). |
| UE Identifier | Optional | The identifier of the UE (i.e. GPSI or identity token) |
| UE location | Optional | The location information of the UE.<br>The UE location is described in clause 7.3.2. |

Fig. 8

| Information element | Status | Description |
|---|---|---|
| > List of EDN configuration information | Mandatory | List of EDN configuration information as defined in Table 8.3.3.3.3-2 |
| EDN connection information (NOTE 1) | Mandatory | Information required by the UE to establish connection with the EDN. |
| > DNN/APN | Mandatory | Data Network Name/Access Point Name |
| List of EESs | Mandatory | List of EESs of the EDN. |
| > EESID | Mandatory | The identifier of the EES |
| > EES Endpoint | Mandatory | The endpoint address (e.g. URI, IP address) of the EES |
| > EEC registration configuration | Mandatory | Indicates whether the EEC is required to register on the EES to use edge services or not. |
| ECS ID (NEW) | Mandatory | Unique ID of the ECS. Indicates which ECS covers the system. |

AMONG EXISTING PARAMETERS, ONLY ESSENTIAL PARAMETERS (Mandatory) ARE SELECTIVELY SHOWN

Fig. 9

| Information element | Status | Description |
|---|---|---|
| Requestor identifier | Mandatory | The ID of the requestor (e.g. EECID) |
| ECS ID | Mandatory | Unique ID of the ECS. Indicates which ECS covers the system. |
| Security credentials | Mandatory | Security credentials resulting from a successful authorization for the edge computing service. |

Fig. 10

| Information element | Status | Description |
|---|---|---|
| ECS ID | Mandatory | Unique ID of the ECS. Indicates which ECS covers the system. |
| > Discovered EAS list | Optional | List of discovered EAS(s).<br>Each element includes the information described below. |
| >> EAS profile | Mandatory | Profile of the EAS. Each element is described in clause 8.2.4. |
| >> Lifetime | Optional | Time interval or duration during which the information elements in the EAS profile is valid and supposed to be cached in the EEC (e.g. time-to-live value for an EAS Endpoint) |

AMONG EXISTING PARAMETERS, ONLY ESSENTIAL PARAMETERS (Mandatory) AND SOME ARBITRARY PARAMETERS (OPTIONAL) ARE SELECTIVELY SHOWN

Fig. 11

EDGE CONFIGURATION SERVER, MULTI-ACCESS SYSTEM, METHOD, AND COMPUTER-READABLE MEDIUM

INCORPORATION BY REFERENCE

This application is a Continuation of U.S. application Ser. No. 18/235,186 filed on Aug. 17, 2023, which is based upon and claims the benefit of priority from Japanese patent application No. 2022-132895, filed on Aug. 24, 2022, the disclosure of which is incorporated herein in its entirety by reference.

TECHNICAL FIELD

The present disclosure relates to an edge configuration server, a multi-access system, a method, and a computer-readable medium and, more particularly, to an edge configuration server, a multi-access system, a method, and a computer-readable medium that make it possible to relocate an application context between different multi-access edge computing systems.

BACKGROUND ART

The European Telecommunications Standards Institute (ETSI) promotes the standardization of multi-access edge computing (MEC) systems (see ETSI GR MEC 035 v3.1.1 (2021-06) "Multi-access Edge Computing (MEC); Study on Inter-MEC systems and MEC-Cloud systems coordination", the European Telecommunications Standards Institute, June 2021). A method has been defined for relocating an application context within the same MEC system, that is, under the coverage of a single edge configuration server (ECS) when an application client (AC) moves from a service area to another service area.

On the other hand, it is sought to further enlarge a scope of use and enhance performance through coordination between an edge application server (EAS) in a MEC system and an EAS in another MEC system. However, no method is defined for relocating an application context beyond a boundary of the same MEC system (the coverage of a single ECS). In other words, no method is defined for relocating an application context between an EAS in a MEC system and an EAS in another MEC system.

In International Patent Publication No. WO2018/078987, (0087) reads as follows: "The HSS 9 examines the request message received from the MEC server, . . . , and sends . . . . The request message in Step 1003 . . . may also contain an identifier of the MEC server." Moreover, in International Patent Publication No. WO2018/078987, (0088) reads as follows: "In response to the request message (Step 1003) from the HSS 9, the MME6 sends, to the HSS9, a response message (Step 1006) containing the second identifier . . . "

SUMMARY

As described above, a method for relocating an application context between an EAS in a MEC system and an EAS in another MEC system has not been defined. Accordingly, there has been a problem that it is difficult to relocate an application context between different multi-access edge computing systems.

An example object of the present disclosure is to provide an edge configuration server, a multi-access system, a method, and a computer-readable medium that can solve the above-described problem.

In a first example aspect of the present disclosure, an edge configuration server is a server included in a multi-access edge computing (MEC) system, and includes: a reception unit configured to receive, from a source-edge enabler server (S-EES) in the MEC system, an inquiry about a relocation target of an application context; and a transmission unit configured to transmit, to another edge configuration server (ECS) in another MEC system, an inquiry about the relocation target.

In a second example aspect of the present disclosure, an edge configuration server is a server included in a multi-access edge computing (MEC) system, and includes: a reception unit configured to receive, from a source-edge enabler server (S-EES) in another MEC system via another edge configuration server (ECS) in the other MEC system, an inquiry about a relocation target of an application context; a determination unit configured to determine, as the relocation target, a target-edge enabler server (T-EES) in the MEC system; and a transmission unit configured to return, to the other ECS, a T-EES identifier of the T-EES and an ECS identifier of the ECS in the MEC system.

In a third example aspect of the present disclosure, a multi-access system includes: a first multi-access edge computing (MEC) system; and a second multi-access edge computing system, in which the first multi-access edge computing system includes a source-edge enabler server (S-EES), and a first edge configuration server (ECS) configured to manage the source-edge enabler server, the second multi-access edge computing system includes a target-edge enabler server (T-EES), and a second edge configuration server configured to manage the target-edge enabler server, and the first edge configuration server includes a first reception unit configured to receive, from the source-edge enabler server, an inquiry about a relocation target of an application context, and a first transmission unit configured to transmit, to the second edge configuration server, an inquiry about the relocation target.

In a fourth example aspect of the present disclosure, a method includes: by a server included in a multi-access edge computing (MEC) system, receiving, from a source-edge enabler server (S-EES) in the MEC system, an inquiry about a relocation target of an application context; and transmitting, to another edge configuration server (ECS) in another MEC system, an inquiry about the relocation target.

In a fifth example aspect of the present disclosure, a non-transitory computer-readable medium stores a program, the program causing a computer to serve as a server included in a multi-access edge computing (MEC) system and to execute: receiving, from a source-edge enabler server (S-EES) in the MEC system, an inquiry about a relocation target of an application context; and transmitting, to another edge configuration server (ECS) in another MEC system, an inquiry about the relocation target.

BRIEF DESCRIPTION OF DRAWINGS

The above and other aspects, features and advantages of the present disclosure will become more apparent from the following description of certain exemplary embodiments when taken in conjunction with the accompanying drawings, in which:

FIG. 6 is a message format illustrating content of a message according to the example embodiment;

FIG. 7 is a message format illustrating content of a message according to the example embodiment;

FIG. 8 is a message format illustrating content of a message according to the example embodiment;

FIG. 9 is a message format illustrating content of a message according to the example embodiment;

FIG. 10 is a message format illustrating content of a message according to the example embodiment;

FIG. 11 is a message format illustrating content of a message according to the example embodiment;

EXAMPLE EMBODIMENTS

Hereinafter, an example embodiment of the present disclosure is described with reference to the drawings. Throughout the drawings, the same or corresponding elements are denoted by the same reference signs, and duplicate description is omitted as necessary for the sake of clarity.

Example Embodiment

<Configuration>

Figure 1:
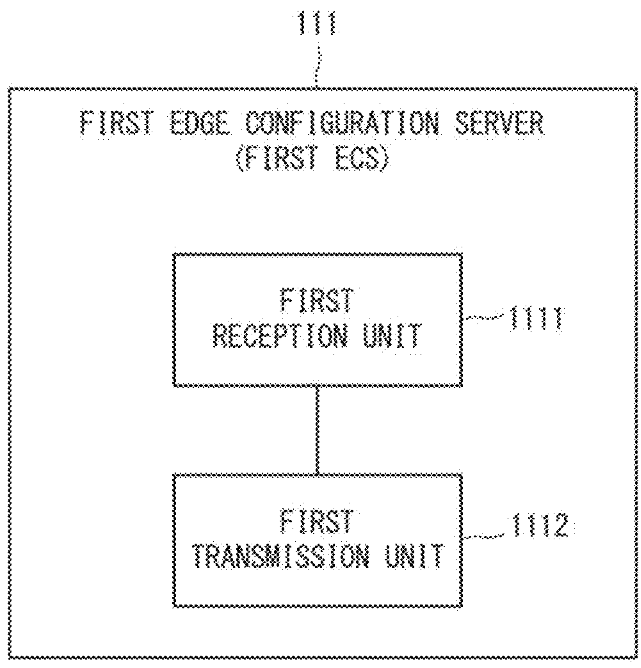
FIG. 1 is a block diagram illustrating a first edge configuration server according to an example embodiment.

FIG. 1 is a block diagram illustrating a first edge configuration server according to an example embodiment.

Figure 2:
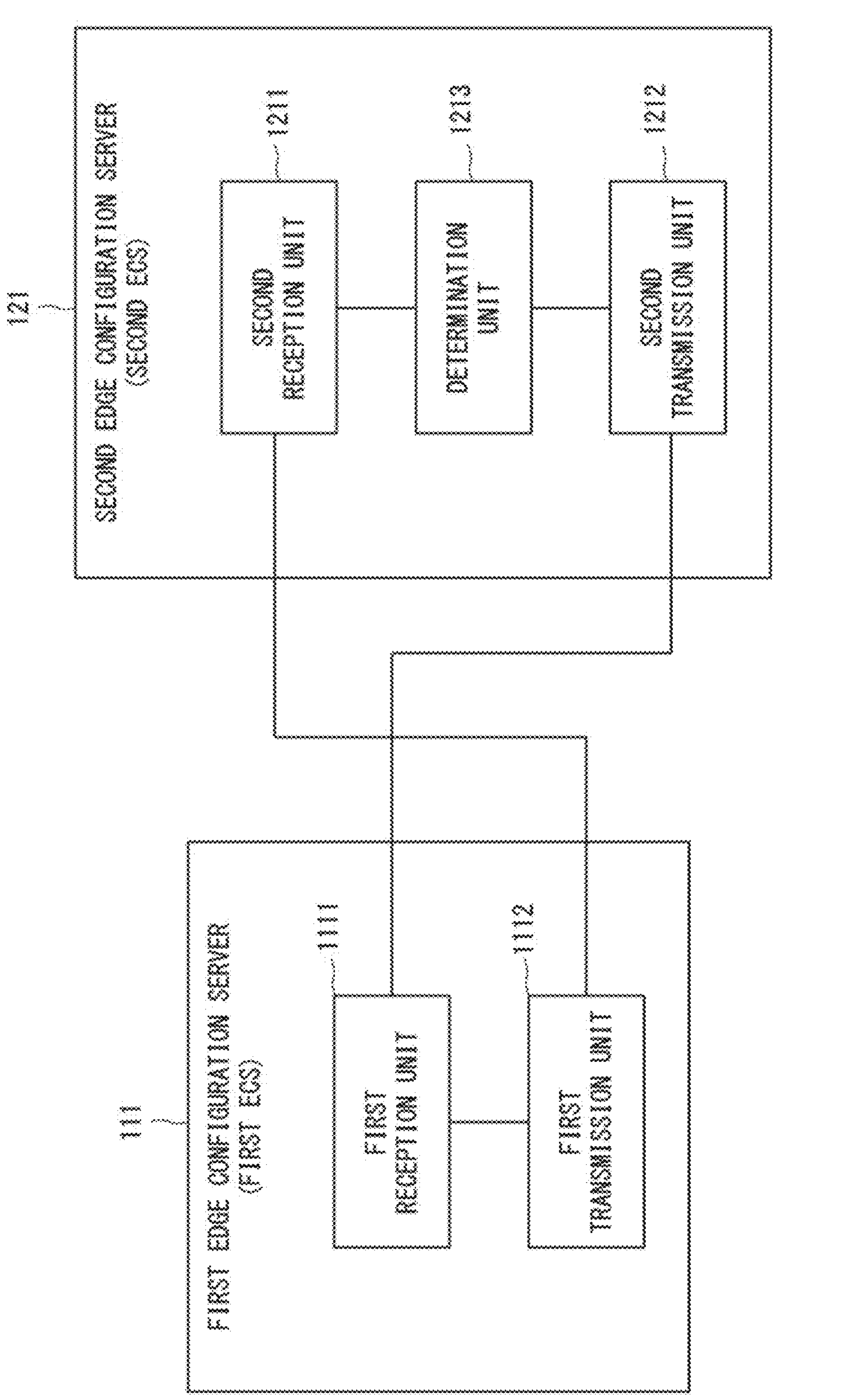
FIG. 2 is a block diagram illustrating a second edge configuration server according to the example embodiment.

FIG. 2 is a block diagram illustrating a second edge configuration server according to the example embodiment.

Figure 3:
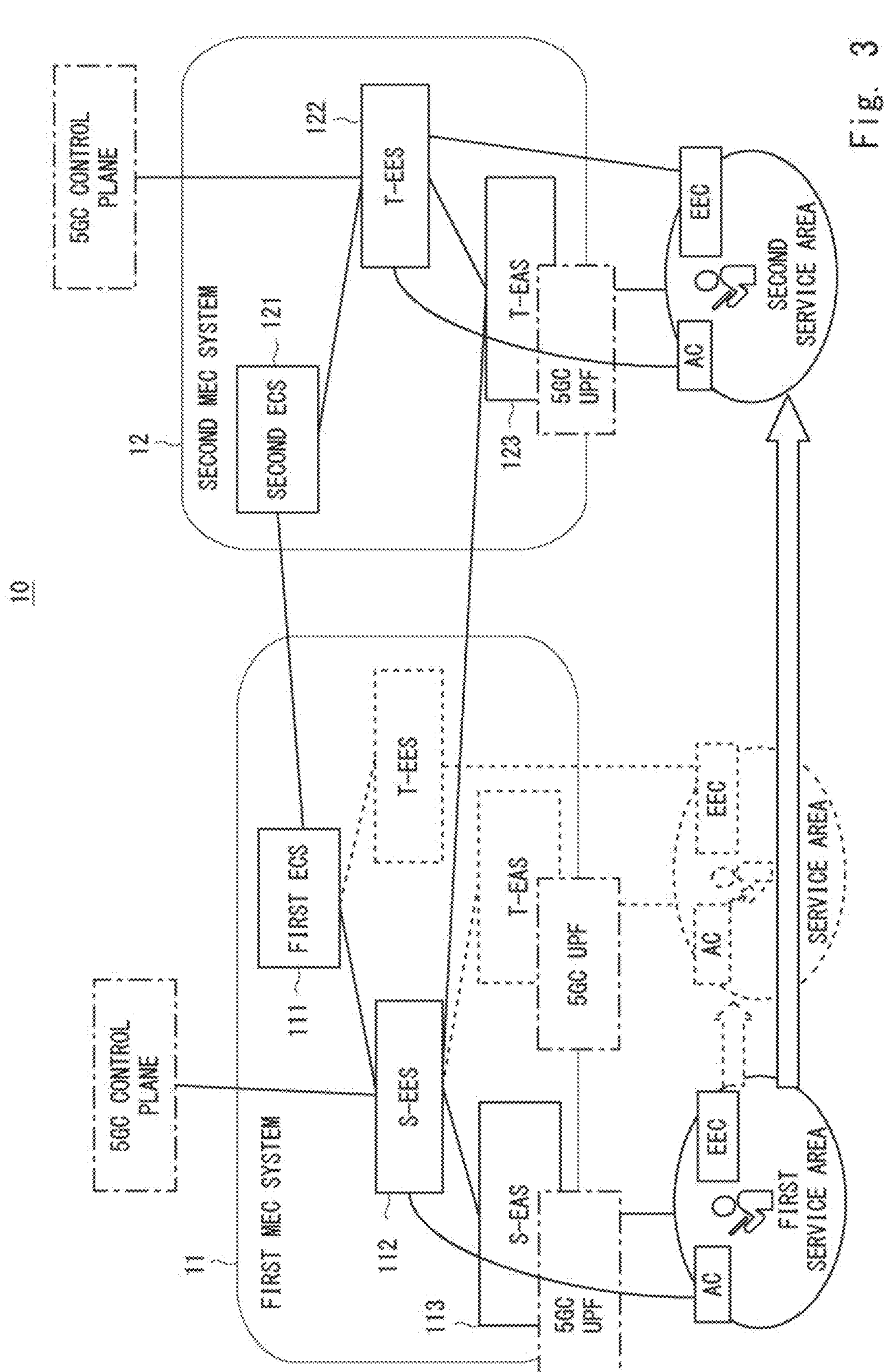
FIG. 3 is a block diagram illustrating a multi-access system according to the example embodiment.

FIG. 3 is a block diagram illustrating a multi-access system according to the example embodiment.

As shown in FIGS. 1 and 3, the multi-access system (MAS) 10 according to the example embodiment includes a first multi-access edge computing (MEC) system 11 and a second MEC system 12.

Edge computing (EC) is a network technology in which data is processed at an edge portion of a computer network. EC is a computing scheme of processing data at a network edge portion where a user-side terminal, a server installed nearby, and the like are present. Since processing is performed at an "edge," which is a place closer to a terminal, the technology (scheme) has an advantageous effect of reducing an impact due to a processing delay, compared to cases where processing is performed at places that are not "edges."

The first MEC system 11 includes a source-edge enabler server (S-EES) 112 and the first edge configuration server (ECS) 111 that manages the S-EES 112. Here, the S-EES is a relocation source-EES The second MEC system 12 includes a target-edge enabler server (T-EES) 122 and the second ECS 121 that manages the T-EES 122. The T-EES is a relocation target-EES. Note that the first MEC system may be simply referred to as MEC system, and the second MEC system may be referred to as external MEC system, in some cases.

The first edge configuration server (ECS) 111 includes a first reception unit 1111 and a first transmission unit 1112.

The first reception unit 1111 receives, from the source-edge enabler server (S-EES) 112 in the first multi-access edge computing (MEC) system 11, an inquiry about a relocation target of an application context.

The first transmission unit 1112 transmits, to the second ECS 121 in the second MEC system 12, an inquiry about the relocation target.

Specifically, after receiving the inquiry about the relocation target of the application context, the first ECS 111 immediately makes the inquiry about the relocation target to the second ECS 121, which is an ECS in the second MEC system 12.

Note that when the first ECS is viewed as a subject, the first ECS may be referred to as ECS, the first MEC system may be referred to as MEC system, the second ECS may be referred to as another ECS, and the second MEC system may be referred to as another MEC system, in some cases. The ECS and the S-EES are included in the MEC system. Moreover, the first reception unit may be referred to as reception unit, and the first transmission unit may be referred to as transmission unit, in some cases.

As shown in FIGS. 2 and 3, the second ECS 121 according to the example embodiment includes a second reception unit 1211, a second transmission unit 1212, and a determination unit 1213.

The second reception unit 1211 receives, from the first ECS 111 (via the first ECS 111), the inquiry about the relocation target of the application context from the source-edge enabler server (S-EES) in the first MEC system 11.

The determination unit 1213 determines the target-edge enabler server (T-EES) in the second MEC system 12 as the relocation target of the application context.

The second transmission unit 1212 returns, to the first ECS 111, a T-EES identifier (ID) of the T-EES 122 and an ECS ID of the second ECS 121 in the second MEC system 12.

Specifically, when the second ECS 121 receives the inquiry about the relocation target of the application context from the first ECS 111, the second ECS 121 returns (responds with) the ECS ID of the second ECS 121 in addition to the T-EES ID of the T-EES 122 that is an outcome of the inquiry.

Note that the first ECS 111 may include a determination unit similarly to the second ECS 121. Thus, the first ECS 111 and the second ECS 121 have similar functions and therefor can be used without distinction.

Note that when the second ECS is viewed as a subject, the second ECS may be referred to as ECS, the second MEC system may be referred to as MEC system, the first ECS may be referred to as another ECS, and the first MEC system may be referred to as another MEC system, in some cases. The ECS and the T-EES are included in the MEC system. Moreover, the second reception unit may be referred to as reception unit, and the second transmission unit may be referred to as transmission unit, in some cases.

The second transmission unit 1212 may return the T-EES ID and the ECS ID of the second ECS 121 to the first ECS 111 by being triggered by a fact that an edge enabler client (EEC) connected to the S-EES 112 moves from the first service area managed by the S-EES 112 to the second service area managed by the T-EES 122.

The T-EES ID and the ECS ID of the second ECS 121 are returned to the S-EES 112 via the first ECS 111.

The T-EES ID and the ECS ID of the second ECS 121 are returned from the S-EES 112 to a source-edge application server (S-EAS) 113 in the first MEC system 11.

Note that the first ECS and the second ECS are collectively referred to as edge configuration server (ECS).

Advantageous Effects

In the multi-access system 10 according to the example embodiment, when an inquiry about a relocation target is made from the first ECS 111 in the first MEC system 11 to the second ECS 121 in the second MEC system 12, the T-EES identifier of the T-EES 122 and the ECS identifier of the second ECS 121 are returned to the first ECS 111. At the time, a T-EAS identifier of a T-EAS 123 may also be returned, which will be described later.

Thus, the application context can be relocated from the first MEC system 11 to the second MEC system 12. As a result, an ECS, a MEC system, a method, and a computer-readable medium can be provided that make it possible to relocate an application context between different MEC systems.

<Outline of Operation>

Figure 4:
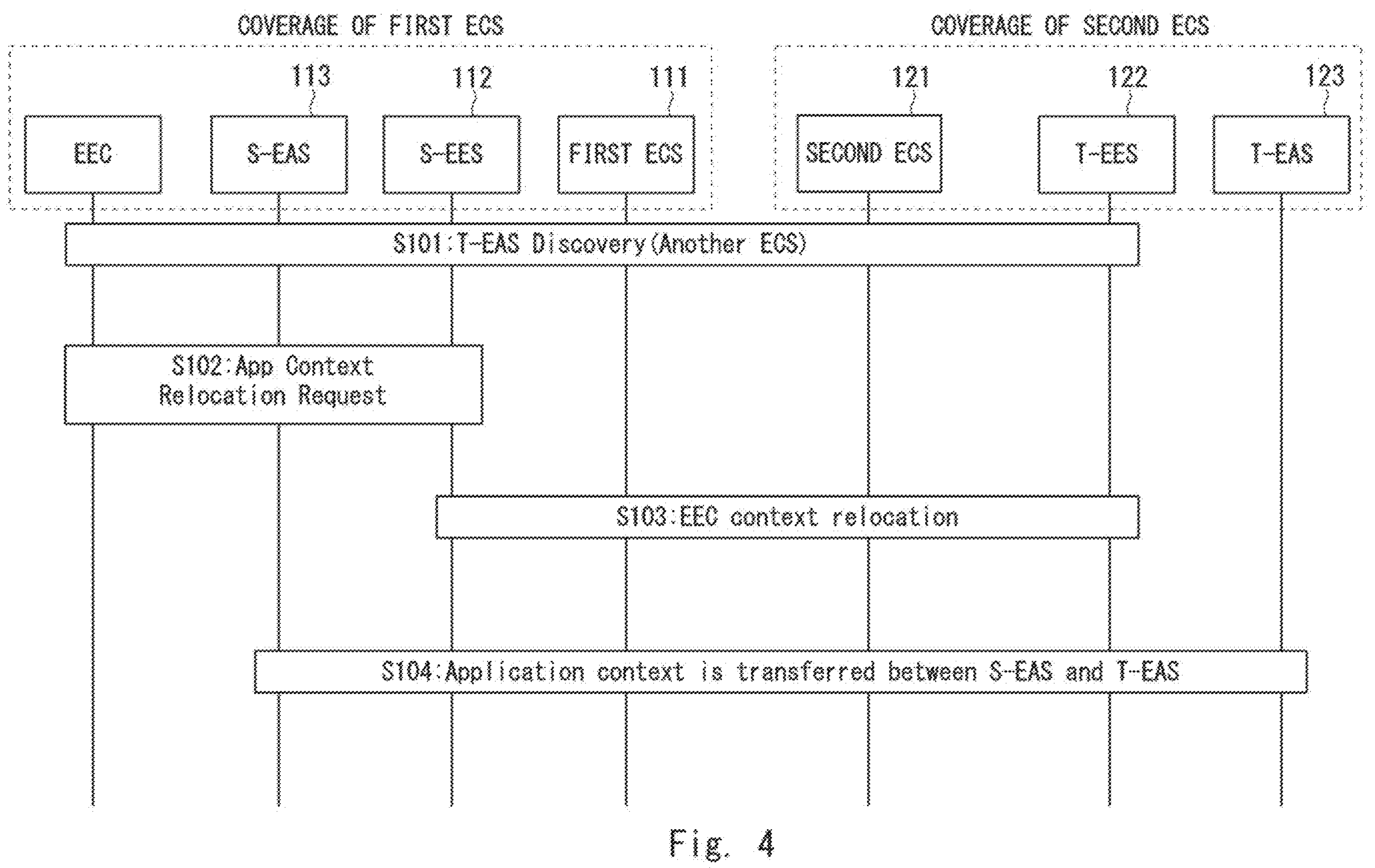
FIG. 4 is a sequence chart illustrating operation of the multi-access system according to the example embodiment.

FIG. 4 is a sequence chart illustrating operation of the multi-access system according to the example embodiment.

FIG. 4 shows a whole sequence of application context relocation from the first MEC system to the second MEC system.

As shown in FIG. 4, the S-EAS 113 retrieves an available EAS by being triggered by a movement event (see FIG. 3) in which a covered UE (user equipment) moves from the first service area to the second service area (step S101: T-EAS Discovery (Another ECS)). Note that the UE (user equipment) is an application client (AC) UE under the coverage of the S-EAS 113. In some cases, the second ECS may be referred to as another ECS.

Here, a description will be given by using an example in which the first ECS 111 selects the T-EAS 123 in the second MEC system 12 as a relocation target (a result of retrieving an available EAS) through interactions with a plurality of ECSs.

After step S101, the S-EAS 113 or the edge enabler client (EEC) makes a request to the S-EES 112 for relocation of a MEC application (step S102: App Context Relocation Request).

The S-EES 112 transfers an EEC context to the T-EES 122 (step S103: EEC context relocation). At the time, the ECS ID indicating the second ECS 121 that is a relocation target is added.

The S-EAS 113 transfers an application context to the T-EAS 123 (step S104: Application context is transferred between S-EAS and T-EAS). At the time, the ECS ID indicating the second ECS 121 is added.

Here, the ECS ID indicating the second ECS 121 is added to the result of retrieving an available EAS, in addition to the T-EAS ID indicating the T-EAS 123.

<Detailed Operation of EAS Discovery Procedure>

Figure 5:
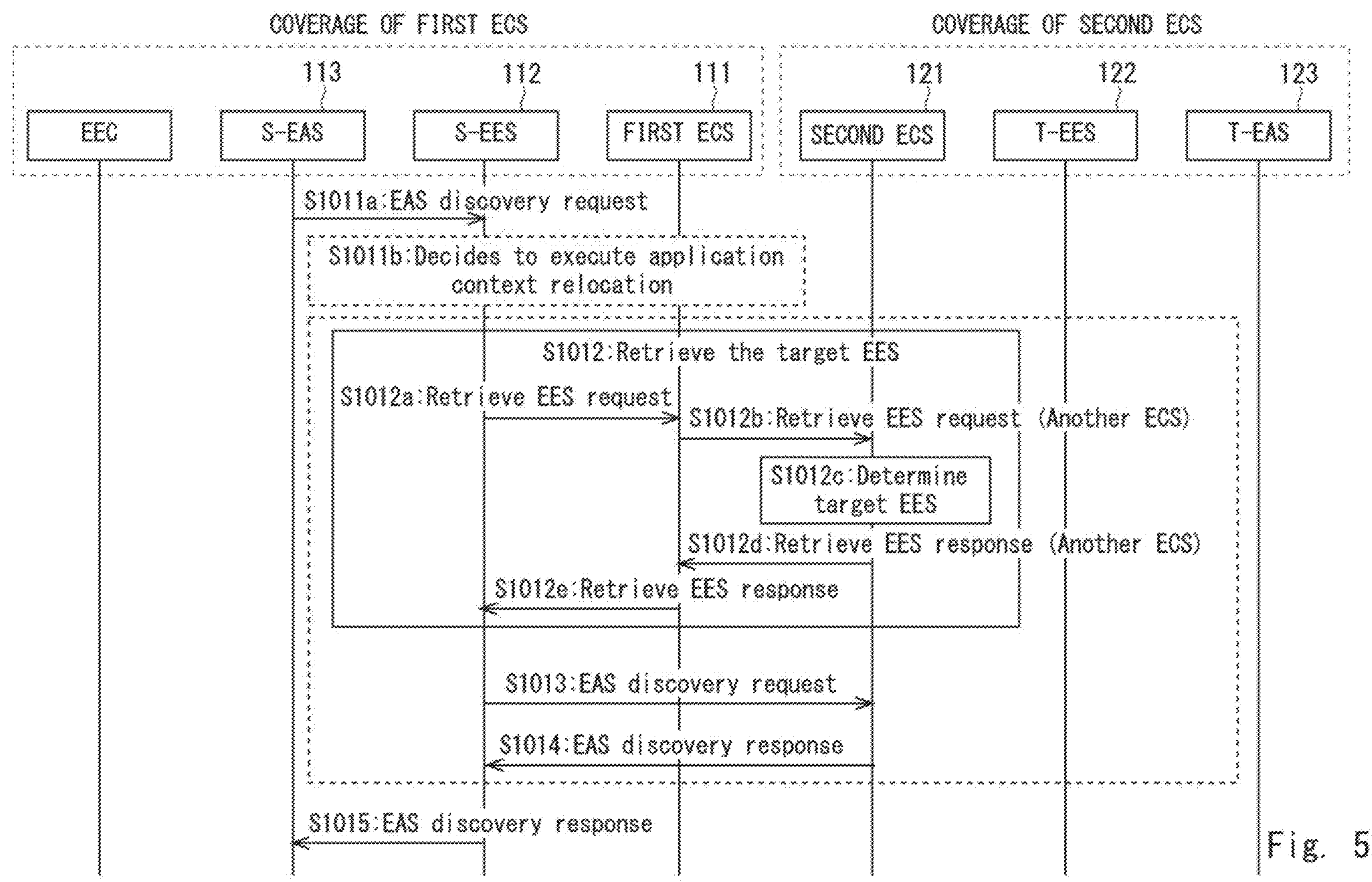
FIG. 5 is a sequence chart illustrating operation of the multi-access system according to the example embodiment.

FIG. 5 is a sequence chart illustrating operation of the multi-access system according to the example embodiment.

FIG. 5 shows details of a T-EAS discovery procedure (step S101: T-EAS Discovery (Another ECS)), which is part of the whole sequence shown in FIG. 4.

First, in order to retrieve an EAS available to UE, the S-EAS 113 transmits an EAS discovery request to the S-EES 112 (step S1011*a*: EAS discovery request).

The S-EES 112 decides whether or not to execute application context relocation (step S1011*b*: Decides to execute application context relocation). Here, a description will be given based on the premise that relocation is executed.

The S-EES 112 makes an inquiry to the first ECS 111 about a relocation-target EES (step S1012*a*: Retrieve EES request).

In response to the inquiry in step S1012*a*, there are a case where the relocation-target EES is selected from within the first MEC system 11, and a case where the relocation-target EES is selected (the relocation-target EES is requested) from within the second MEC system 12. In the present example, a description will be given by using an example where the first ECS 111 requests the relocation-target EES within the second MEC system 12.

Note that for the method of selecting the relocation-target EES, for example, a method of determining the relocation-target EES based on an area where the UE is currently present and a respective service area of each MEC system, a method of determining the relocation-target EES based on status of a respective processing load on each MEC system, or the like may be used. However, the example embodiment is not limited to such methods.

After step S1012*a*, the first ECS 111 makes an inquiry to the second ECS 121 (ECS in the second MEC system 12) about the relocation-target EES (step S1012*b*: Retrieve EES request (Another ECS)).

Here, the operation in steps S1011*a*, S1012*a*, and S1012*b* can be summarized as follows.

When a discovery request is outputted from the S-EAS 113 to the S-EES 112 (step S1011*a*), an inquiry about a relocation target is transmitted from the S-EES 112 to the second ECS 121 via the first ECS 111 (step S1012*a*, step S1012*b*).

After step S1012*b*, the second ECS 121 determines the relocation-target EES in the second MEC system 12 (step S1012*c*: Determine target EES). Here, the relocation-target EES is assumed to be the T-EES 122.

The second ECS 121 returns, to the first ECS 111, information on the relocation-target EES determined in step S1012*c* (step S1012*d*: Retrieve EES response (Another ECS)). The operation in step S1012*d* is an operation of responding to step S1012*b*.

The first ECS 111 returns, to the S-EES 112, the information on the relocation-target EES acquired in step S1012*d* (step S1012*e*: Retrieve EES response). The operation in step S1012*e* is an operation of responding to step S1012*a*. The information on the relocation-target EES is, for example, the EES ID.

After step S1012*e*, the S-EES 112 makes an inquiry to the second ECS 121 about a relocation-target EAS that is a result of retrieval in step S1012*c* (step S1013: EAS discovery request). Specifically, the second reception unit 1211 of the second ECS 121 receives the inquiry about a relocation target from the S-EES 112. Note that the relocation-target EAS is the T-EAS 123.

The second ECS 121 returns, to the S-EES 112, information on the relocation-target EAS (T-EAS 123) (step S1014: EAS discovery response). Specifically, the determination unit 1213 of the second ECS 121 determines the T-EAS 123 in the second MEC system 12 as the relocation target, and the second transmission unit 1212 returns the T-EAS ID to the S-EES 112. The information on the T-EAS is, for example, the T-EAS ID.

The S-EES 112 returns, to the S-EAS 113, the information on the relocation-target EAS (T-EAS 123) acquired in step S1014 (step S1015: EAS discovery response). Specifically, the S-EES 112 returns the T-EAS ID to the S-EAS 113 in the first MEC system 11. The operation in step S1015 is an operation of responding to step S1011*a*.

Note that in steps S1014 and S1015, the ECS ID, in addition to the T-EAS ID, may be notified to the S-EAS 113.

The second transmission unit 1212 of the second ECS 121 may return the ECS ID together with the T-EES ID to the S-EES 112 via the first ECS 111 (steps S1012*d* and S1012*e*), or instead may return the ECS ID together with the T-EAS ID to the S-EAS 113 (steps S1014 and S1015).

<Message Format>

Here, message formats of the messages in steps S1012*a* to S1014 shown in FIG. 5 are described.

FIG. 6 is a message format illustrating content of a message according to the example embodiment.

FIG. 6 shows the message format in step S1012*a*.

As shown in FIG. 6, for the message format in step S1012*a*: Retrieve EES request, the same one as an existing message format that is defined in 3GPP TS23.558 V17.4.0 (2022-06) "3rd Generation Partnership Project; Technical Specification Group Services and System Aspects; Architecture for enabling Edge Applications; (Release 17)" is used.

FIG. 7 is a message format illustrating content of a message according to the example embodiment.

FIG. 7 shows the message format in step S1012*e*.

As shown in FIG. 7, for the message format in step S1012*e*: Retrieve EES response), the same one as an existing message format that is defined in 3GPP TS23.558 V17.4.0 (2022-06) "3rd Generation Partnership Project; Technical Specification Group Services and System Aspects; Architecture for enabling Edge Applications; (Release 17)" is used. In FIG. 7, only essential parameters (Mandatory) are selectively shown.

FIG. 8 is a message format illustrating content of a message according to the example embodiment.

FIG. 8 shows the message format in step S1012*b*.

As shown in FIG. 8, for the message format in step S1012*b*: Retrieve EES request (Another ECS), a message format created by adding an extension part (an underlined part) according to the example embodiment to an existing message format that is defined in 3GPP TS23.558 V17.4.0 (2022-06) "3rd Generation Partnership Project; Technical Specification Group Services and System Aspects; Architecture for enabling Edge Applications; (Release 17)" is used.

FIG. 9 is a message format illustrating content of a message according to the example embodiment.

FIG. 9 shows the message format in step S1012*d*.

As shown in FIG. 9, for the message format in step S1012*d*: Retrieve EES response (Another ECS), a message format created by adding an extension part (an underlined part) according to the example embodiment to an existing message format that is defined in 3GPP TS23.558 V17.4.0 (2022-06) "3rd Generation Partnership Project; Technical Specification Group Services and System Aspects; Architecture for enabling Edge Applications; (Release 17)" is used.

FIG. 10 is a message format illustrating content of a message according to the example embodiment.

FIG. 10 shows the message format in step S1013.

As shown in FIG. 10, for the message format in step S1013: EAS discovery request, a message format created by adding an extension part (an underlined part) according to the example embodiment to an existing message format that is defined in 3GPP TS23.558 V17.4.0 (2022-06) "3rd Generation Partnership Project; Technical Specification Group Services and System Aspects; Architecture for enabling Edge Applications; (Release 17)" is used.

FIG. 11 is a message format illustrating content of a message according to the example embodiment.

FIG. 11 shows the message format in step S1014.

As shown in FIG. 11, for the message format in step S1014: EAS discovery response, a message format created by adding an extension part (an underlined part) according to the example embodiment to an existing message format that is defined in 3GPP TS23.558 V17.4.0 (2022-06) "3rd Generation Partnership Project; Technical Specification Group Services and System Aspects; Architecture for enabling Edge Applications; (Release 17)" is used.

Comparison Example

Figure 12:
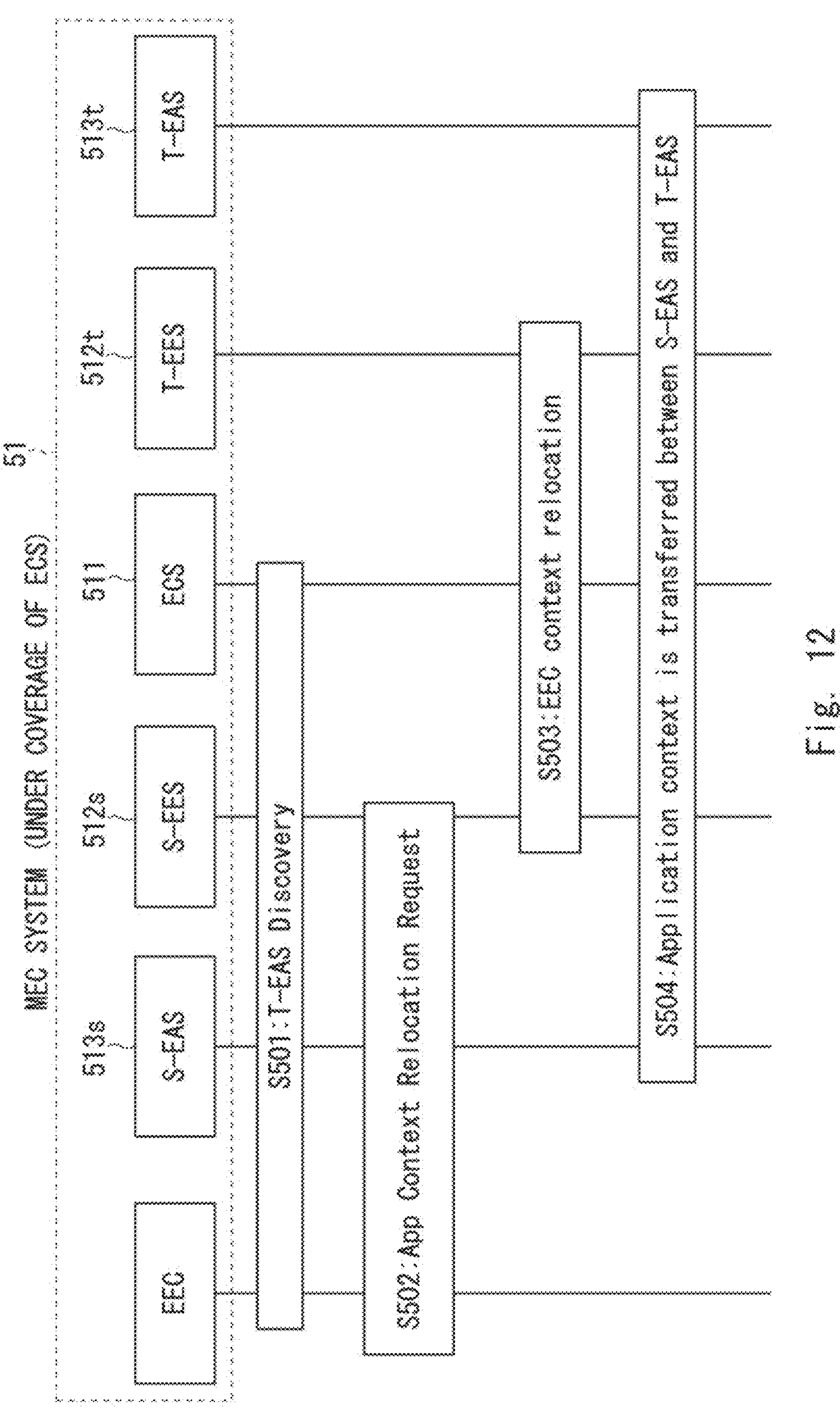
FIG. 12 is a sequence chart illustrating operation of a multi-access system according to a comparison example of the example embodiment.

FIG. 12 is a sequence chart illustrating operation of a multi-access system according to a comparison example of the example embodiment.

Figure 13:
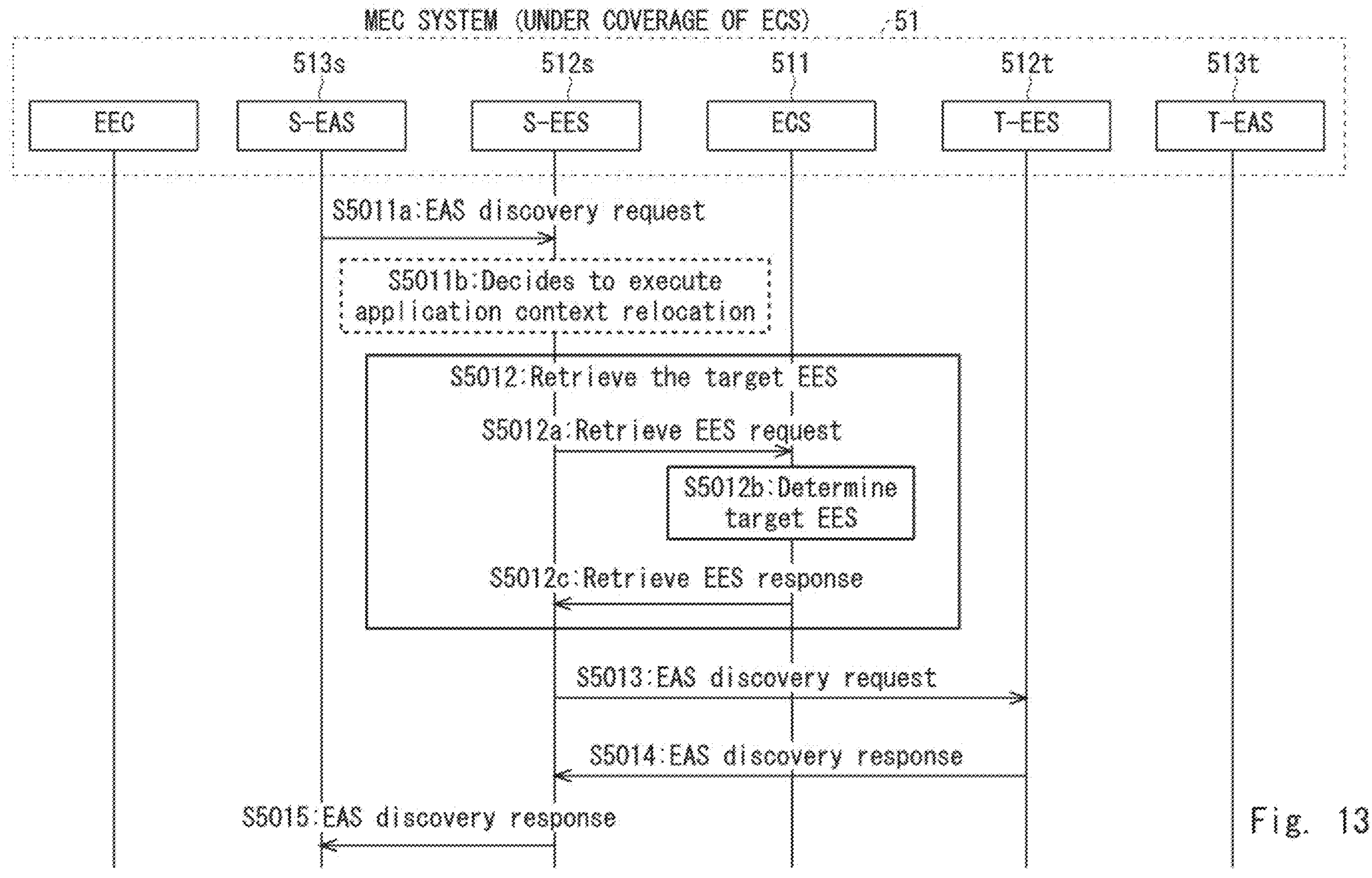
FIG. 13 is a sequence chart illustrating operation of the multi-access system according to the comparison example of the example embodiment.

FIG. 13 is a sequence chart illustrating operation of the multi-access system according to the comparison example of the example embodiment.

FIG. 13 shows details of a T-EAS discovery procedure (step S501: T-EAS Discovery), which is part of a whole sequence shown in FIG. 12.

As shown in FIGS. 12 and 13, in the multi-access system according to the comparison example, compared to the multi-access system 10 according to the example embodiment, a second MEC system (second ECS and the like) is absent, and a sequence for communicating with the second MEC system is not defined. In other words, the multi-access system according to the comparison example is premised on application context relocation that is executed within a single MEC system 51. Accordingly, in the multi-access system according to the comparison example, it is not defined to execute application context relocation between different MEC systems.

In the comparison example, it is difficult to provide an edge configuration server, a multi-access system, a method, and a computer-readable medium that make it possible to relocate an application context between different multi-access edge computing systems.

Note that although the present disclosure is described as a hardware configuration in the above-described example embodiment, the present disclosure is not limited to such a configuration. The present disclosure can also be implemented by causing a CPU (central processing unit) to execute a computer program and thereby to perform the processing by each constituent element.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Moreover, although the operations are illustrated in specific order, such illustrations should not be understood as those requiring the operations to be executed in the illustrated specific order or in the sequential order, or requiring all the illustrated operations to be executed, in order to achieve a desired result. In some particular situations, there are some cases where multitask and parallel processing are advantageous. Similarly, although some specific details of the example embodiment are included in the above description, such details should be construed not as limitation to the scope of the present disclosure but as explanation of characteristics specific to a certain example embodiment. Specific characteristics described in contexts of different example embodiments may be implemented by being combined into a single example embodiment. Conversely, various characteristics described in a context of a single example embodiment may be implemented separately, or in arbitrary appropriate combinations, in a plurality of example embodiments.

While the present disclosure has been described with reference to the example embodiment, the present disclosure is not limited by the description given above. Various changes that can be understood by those ordinarily skilled in the art may be made in the configurations and details of the present disclosure within the scope of the disclosure.

Note that the present disclosure is not limited to the above-described example embodiment and can be changed appropriately without departing from the scope and spirit of the present disclosure.

The whole or part of the exemplary embodiments disclosed above can be described as, but not limited to, the following supplementary notes.

Supplementary Note 1

An edge configuration server being a server included in a multi-access edge computing (MEC) system, the edge configuration server comprising: a reception unit configured to receive, from a source-edge enabler server (S-EES) in the MEC system, an inquiry about a relocation target of an application context; and a transmission unit configured to transmit, to another edge configuration server (ECS) in another MEC system, an inquiry about the relocation target.

Supplementary Note 2

An edge configuration server being a server included in a multi-access edge computing (MEC) system, the edge configuration server comprising: a reception unit configured to receive, from a source-edge enabler server (S-EES) in another MEC system via another edge configuration server (ECS) in the other MEC system, an inquiry about a relocation target of an application context; a determination unit configured to determine, as the relocation target, a target-edge enabler server (T-EES) in the MEC system; and a transmission unit configured to return, to the other ECS, a T-EES identifier of the T-EES and an ECS identifier of the ECS in the MEC system.

Supplementary Note 3

The edge configuration server according to supplementary note 2, wherein the transmission unit is configured to return the T-EES identifier and the ECS identifier to the other ECS by being triggered by a fact that an edge enabler client (EEC) connected to the S-EES moves from a first service area managed by the S-EES to a second service area managed by the T-EES.

Supplementary Note 4

The edge configuration server according to supplementary note 2, wherein the T-EES identifier and the ECS identifier are returned to the S-EES via the other ECS.

Supplementary Note 5

The edge configuration server according to supplementary note 4, wherein the T-EES identifier and the ECS identifier are returned from the S-EES to a source-edge application server (S-EAS) in the other MEC system.

Supplementary Note 6

The edge configuration server according to supplementary note 5, wherein when a discovery request is outputted from the S-EAS to the S-EES, the inquiry about the relocation target is transmitted from the S-EES to the ECS via the other ECS.

Supplementary Note 7

A multi-access system including: a first multi-access edge computing (MEC) system; and a second multi-access edge computing system, wherein the first multi-access edge computing system includes a source-edge enabler server (S-EES), and a first edge configuration server (ECS) configured to manage the source-edge enabler server, the second multi-access edge computing system includes a target-edge enabler server (T-EES), and a second edge configuration server configured to manage the target-edge enabler server, and the first edge configuration server includes a first reception unit configured to receive, from the source-edge enabler server, an inquiry about a relocation target of an application context, and a first transmission unit configured to transmit, to the second edge configuration server, an inquiry about the relocation target.

Supplementary Note 8

The multi-access system according to supplementary note 7, wherein the second edge configuration server includes a second reception unit configured to receive, from the first edge configuration server, the inquiry about the relocation target, a determination unit configured to determine the target-edge enabler server as the relocation target, and a second transmission unit configured to return, to the first edge configuration server, a T-EES identifier of the target-edge enabler server and an ECS identifier of the second edge configuration server.

Supplementary Note 9

A method comprising: by a server included in a multi-access edge computing (MEC) system, receiving, from a source-edge enabler server (S-EES) in the MEC system, an inquiry about a relocation target of an application context; and transmitting, to another edge configuration server (ECS) in another MEC system, an inquiry about the relocation target.

Supplementary Note 10

A non-transitory computer-readable medium storing a program, the program causing a computer to serve as a server included in a multi-access edge computing (MEC) system and to execute: receiving, from a source-edge enabler server (S-EES) in the MEC system, an inquiry about a relocation target of an application context; and transmitting, to another edge configuration server (ECS) in another MEC system, an inquiry about the relocation target.

Supplementary Note 11

The edge configuration server according to supplementary note 2, wherein the reception unit is configured to receive a further inquiry about the relocation target from the S-EES, the determination unit is configured to determine, as the relocation target, a target-edge application server (T-EAS) in the MEC system, and the transmission unit is configured to return a T-EAS identifier of the T-EAS to a source-edge application server (S-EAS) in the other MEC system via the S-EES.

Supplementary Note 12

The edge configuration server according to supplementary note 11, wherein the transmission unit is configured to return the ECS identifier together with the T-EAS identifier to the S-EAS, instead of returning the ECS identifier together with the T-EES identifier to the S-EES via the other ECS.

According to the present disclosure, an edge configuration server, a multi-access system, a method, and a computer-readable medium can be provided that make it possible to relocate an application context between different multi-access edge computing systems.

What is claimed is:

1. An edge configuration server (ECS) being a server included in a multi-access edge computing (MEC) system, the edge configuration server comprising:

a receiver configured to receive, from a source-edge enabler server (S-EES) in another MEC system via another ECS in the other MEC system, an inquiry about a relocation target of an application context;

a determinator configured to determine, as the relocation target, a target-edge enabler server (T-EES) in the MEC system; and a transmitter configured to return a T-EES identifier of the T-EES and a ECS identifier of the ECS in the MEC system to the other ECS by being triggered by a fact that an edge enabler client (EEC) connected to the S-EES moves from a first service area managed by the S-EES to a second service area managed by the T-EES.

2. The edge configuration server according to claim 1, wherein the T-EES identifier of the T-EES and the ECS identifier of the ECS in the MEC system are returned to the S-EES via the other ECS.

3. The edge configuration server according to claim 2, wherein the T-EES identifier of the T-EES and the ECS identifier of the ECS in the MEC system are returned from the S-EES to a source-edge application server (S-EAS) in the other MEC system.

4. The edge configuration server according to claim 3, wherein when a discovery request is outputted from the S-EAS to the S-EES, the inquiry about the relocation target is transmitted from the S-EES to the ECS via the other ECS.

5. A multi-access system comprising:

a first multi-access edge computing (MEC) system; and a second multi-access edge computing system, wherein the first multi-access edge computing system includes a source-edge enabler server (S-EES), and a first edge configuration server (ECS) configured to manage the source-edge enabler server, the second multi-access edge computing system includes a target-edge enabler server (T-EES), and a second edge configuration server configured to manage the target-edge enabler server, the first edge configuration server includes a first receiver configured to receive, from the source-edge enabler server, an inquiry about a relocation target of an application context, and a first transmitter configured to transmit, to the second edge configuration server, an inquiry about the relocation target, and the second edge configuration server includes a second receiver configured to receive, from the first edge configuration server, the inquiry about the relocation target, a determinator configured to determine the target-edge enabler server as the relocation target a second transmitter is configured to return a T-EES identifier of the T-EES and a ECS identifier of the second edge configuration server in the second multi-access edge computing system to the first edge configuration server by being triggered by a fact that an edge enabler client (EEC) connected to the S-EES moves from a first service area managed by the S-EES to a second service area managed by the T-EES.

* * * * *